United States Patent [19]

Ha-Pham

[11] 4,226,138
[45] Oct. 7, 1980

[54] DEVICE FOR LEVER OPERATION OF THE AIR CONDITIONING CONTROLS OF AN AUTOMOBILE

[75] Inventor: Pascal Ha-Pham, Asnieres, France

[73] Assignee: Regie Nationale des Usines Renault, Boulogne-Billancourt, France

[21] Appl. No.: 915,235

[22] Filed: Jun. 13, 1978

[30] Foreign Application Priority Data

Jun. 13, 1977 [FR] France .................. 77 17987

[51] Int. Cl.² ............................................. G05G 9/00
[52] U.S. Cl. .............................................. 74/471 R
[58] Field of Search ..................... 74/471 R, 480 B; 297/85, 87

[56] References Cited

U.S. PATENT DOCUMENTS

| | | | |
|---|---|---|---|
| 1,036,916 | 8/1912 | Seaman | 74/471 R |
| 2,460,693 | 2/1949 | Hall | 74/471 R |
| 2,497,127 | 2/1950 | Lecarme | 74/471 R |
| 2,851,898 | 9/1958 | Hasty | 74/471 R X |
| 2,918,109 | 12/1959 | Schliephacke | 297/87 X |
| 3,057,221 | 10/1962 | Smith | 74/480 B X |
| 3,164,407 | 1/1965 | Schliephacke | 297/85 |

FOREIGN PATENT DOCUMENTS 596069 4/1960 Canada .................. 74/471 R

Primary Examiner—William H. Schultz
Attorney, Agent, or Firm—Oblon, Fisher, Spivak, McClelland & Maier

[57] ABSTRACT

A control arrangement with a single lever pivoting successively about two articulation axes. The lever is articulated on a fixed plate by the intermediary of at least one link. The link is articulated on the plate at a fixed axis while the lever is articulated on the link at an axis movable with respect to the plate and offset from the fixed axis. In this way, after the lever-link assembly has pivoted around the fixed axis, the link comes up against a stop on the plate so that the movable axis becomes fixed in its turn and the lever continues its travel pivoting about this axis.

5 Claims, 5 Drawing Figures

DEVICE FOR LEVER OPERATION OF THE AIR CONDITIONING CONTROLS OF AN AUTOMOBILE

BACKGROUND OF THE INVENTION

The present invention relates to a device for lever operation to regulate the heating and air conditioning of automobiles and in particular to a multi-control mechanism operated by means of a single lever on the dash.

Remote control arrangements with single-lever operation are known which activate successively several heating system components by means of cables.

Involved in general are mechanical controls realized by means of the main lever, the movement of which is transformed by a set of slots or grooves acting as cams in which are guided projecting pins. Cams and pins are borne alternatively by the main lever, by intermediate articulated links or directly by a supporting plate of the mechanism.

More precisely, a known device consists of a supporting plate provided with two fixed pins about each of which a single lever pierced by two curvilinear openings, articulates successively while the other pin slides in its associated slot.

This arrangement, more especially adapted to the symmetric control of two cables hooked to the lever, does not permit obtaining a constant actuating torque in the case of unbalance in the forces required by each of the cables or, again, when it is necessary to control more than two cables.

On the other hand, the geometry of the plate-lever assembly and the configuration of the slots or cams determine in a fixed manner the trajectory of each point of the lever and thus the orientation of the take-off of the cables, which it is practically impossible to modify for adaptation to different types of vehicles.

Another drawback resides in the fact that the guide slots generate friction which makes it harder to manipulate the lever and entails the risk of jamming, especially in the case of low-cost mass production with large tolerances.

SUMMARY OF THE INVENTION

Accordingly, one object of the invention is to avoid these drawbacks and to realize a control arrangement with a single lever, pivoting successively about two articulation axes and permitting:

the departure of cables in all directions, i.e. the possibility of variable amplitude and orientation strokes of various points of attachment;

successive control of at least two air conditioning components requiring unequal traction forces, while still maintaining a uniformity of manipulation effort over the entire path of lever motion; and elimination of losses in mechanical efficiency due to friction as well as all risk of jamming in mass produced devices.

To this end, the arrangement of the invention is characterized essentially by a fixed plate and a manipulation lever articulated on this plate by the intermediary of at least one link. The link is articulated on the plate at a fixed axis while the lever is articulated on the link at an axis movable with respect to the plate and offset from the fixed axis.

In this way, after the lever-link assembly has pivoted around the fixed axis, the link comes up against a stop on the plate so that the movable axis becomes fixed in its turn and the lever continues its travel pivoting about this axis.

The link may have any shape and possess various prolongations serving to attach the cables in a predetermined direction.

The use of articulations at once eliminates the losses from friction and the risk of jamming.

According to the invention, the lever is preferably articulated by means of two movable axes between two links, one above and one below, in such a way that the movable axis of articulation of the lever with one link is rigorously superposed on the fixed axis of articulation of the other link with the plate when the said links are simultaneously against a stop on the plate.

Each link may be of any shape and may have one or more prolongations on either side of the line between axes for attaching one or more cables.

From the simultaneously stopped position of the link, called the position of rest, the lever can pivot selectively about its front movable axis rendered fixed by the stopped link in carrying along the other link articulated on its second movable axis.

The form of the control lever is such that its position of rest is not necessarily in the middle of its course of travel in front but may, on the contrary, be decentered and adapted to the force required for each command, so as to conserve some uniformity in effort over its entire length of travel.

Thus, the displacement in front will be greater when one link holds two cables at once, or even a single cable harder to move than that attached to the other link.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
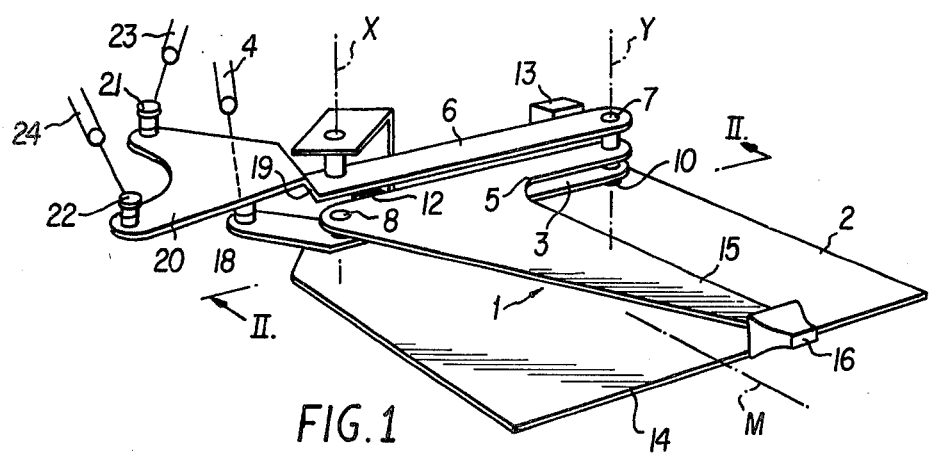
FIG. 1 shows in perspective the lever control arrangement of the invention in its position of rest.
Figure 2:
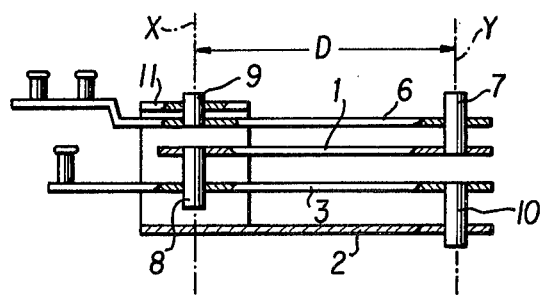
FIG. 2 is a cross section in a plane II passing through the articulation axes of FIG. 1.

Referring now to the drawings, wherein like reference numerals designate identical or corresponding parts throughout the several views, and more particularly to FIGS. 1 and 2, the control arrangement of the invention consists essentially of a main or control lever 1 mounted so as to pivot on a support plate 2 by the intermediary of at least one transmission link 3 to which attaches one or more cables 4 intended for remote control of elements of the vehicle air conditioning.

Preferably, the control lever 1 is articulated by an arm 5 between two parallel links, 6 and 3, the former being disposed above the arm and the latter disposed therebelow, by means of two axes 7, 8, respectively, movable with respect to the plate, offset and mounted in opposite senses, while the links 6 and 3 are respectively articulated on the plate 2 by means of two fixed axes 9, 10, the upper link 6 being mounted on a bracket 11 integral with the plate 2.

As is seen more clearly in FIG. 2, the interaxial distances D of the links and of the lever are equal and the axes of articulation 8, 9 and 7, 10 are superposed on the pivots X, Y when the lever and the links are in the position of FIG. 1, called the position of rest.

In this position, each link 3, 6 is resting against a respective stop 12, 13 of appropriate height, integral with the edge of the plate 2 opposite the front 14. The other arm 15 of lever 1, essentially at right angles to the first 5, projects past the front 14 of the plate and terminates in a button grip 16 accessible on the dash (not shown) of the vehicle.

In the position of rest of FIG. 1, the button 16 is decentered from the center M of the front, giving the lever unequal distances of travel on the two sides of this position for a reason that will appear from the following description.

Apart from the precise positioning of the different axes of articulation, the lever 1 and the terminal parts of the links 3, 6, serving respectively for manipulation and for the attachment of cables, may have any shape.

In the embodiment shown, the bottom link 3 has a bent end 17 carrying an attachment pin 18 and the top link 6 has a slightly offsetting bend 19 followed by a flaring surface carrying simultaneously two pins 21, 22 for the attachment of two distinct cables 23, 24.

The overall device is an assembly of parts made preferably of molded plastic. The articulation axes may either be inserted and clipped in appropriate holes or molded into one piece and then clipped in the other articulating piece. Thus, in FIG. 2, the control lever 1 inserted between the two links 3, 6 has two axes 7, 8 molded thereinto and clipped in corresponding holes in the links. Each of the latter has in addition an axis 9, 10 molded thereinto and clipped in corresponding holes in the plate 2 and the bracket 11. For ease in mounting however it is preferable to make the articulation axis 9 of the top link 6 integral with the bracket 11.

The operation of the device is as follows, with reference to FIGS. 3 and 4.

Figure 3:
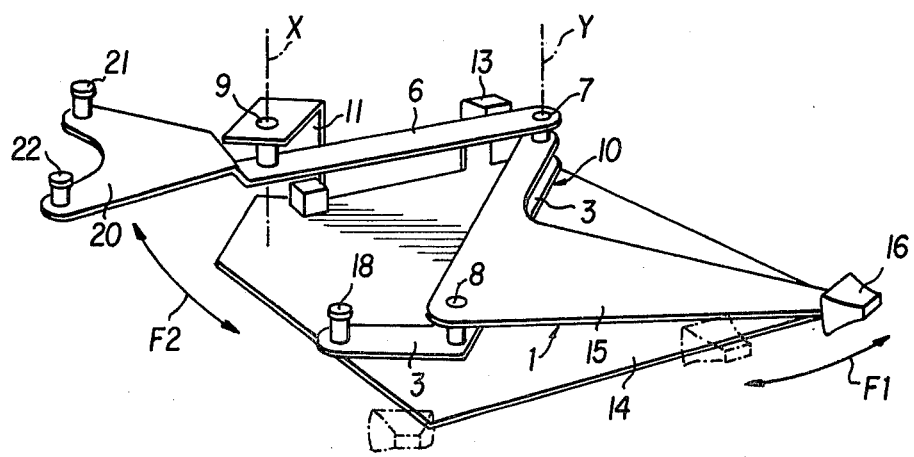
FIGS. 3 and 4 show the two extreme positions of the lever for which it pivots successively about its two axes of articulation.

To go from the position of rest (FIG. 1) to that of FIG. 3 the button 16 of control lever 1 is moved parallel to the front 14 of the plate towards the end corresponding to the smaller distance of travel.

The lever, guided along the front of the plate, carries along the bottom link 3, which is attached to it via the movable axis 8, causing the link to pivot about its fixed axis 10 (not visible).

Being given the form of lever 1 and its simultaneous articulation with the upper link 6 resting against its stop 13, the other movable axis 7 of the lever becomes temporarily fixed and coincides with the fixed axis 10 of the lower link.

Consequently, lower link 3 and lever 1 remain parallel and pivot about the common axis Y.

When the button 16 is moved back and forth following the arrow F1, the end of the bottom link 3 goes through the angular excursion represented by the double arrow F2, determining thus the orientation and motion of the control cable (represented by the pin 18).

Figure 4:
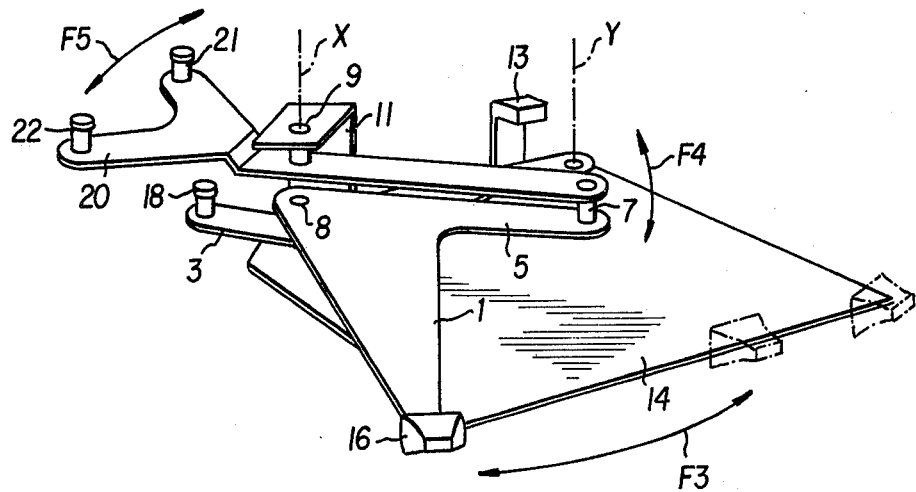

In going from FIG. 3 to FIG. 4 through the position of rest (FIG. 1), the bottom link 3 comes up against its stop 12. Consequently, the axis of articulation 8 with the lever, initially mobile, becomes fixed, while the axis of articulation 7 with the upper link 6 becomes mobile.

Thus, in the course of its full displacement, the lever 1 changes from pivot Y to pivot X by the successive immobilization of each of its two moving axes 7, 8.

The top link 6 is then carried along by the lever 1, the arm 5 of which remains parallel to it (between the two axes), and pivots in its turn about its fixed axis 9 mounted on the bracket 11 of the plate and coinciding with the new pivot.

As described above, when the button 16 carries out a back and forth motion following arrow F3, the movable axis 7 of the lever displaces along F4, carrying along the end 20 of the upper link 6 in the angular excursion represented by the double arrow F5 in determining the orientation and travel of the two control cables represented by the pins 21 and 22.

The excursion of each link is tied to its geometry and to that of the control lever. In the embodiment shown the larger excursion of the lever 1 from its position of rest corresponds to the entrainment of the link 6 provided with two attachment pins, i.e. the one required to furnish the greater effort.

This reduction ratio of the mechanism tends thus to obtain, in the case of imbalance in the traction efforts at the links, a uniformity in the efforts and a smoothness of operation over the entire lever travel.

However many links are utilized, the mechanism involves only simple parts and axes of articulation, which has the advantage of eliminating almost completely mechanical losses from friction and, in addition, of simplifying the fabrication of the device with a view to economical mass production.

Figure 5:
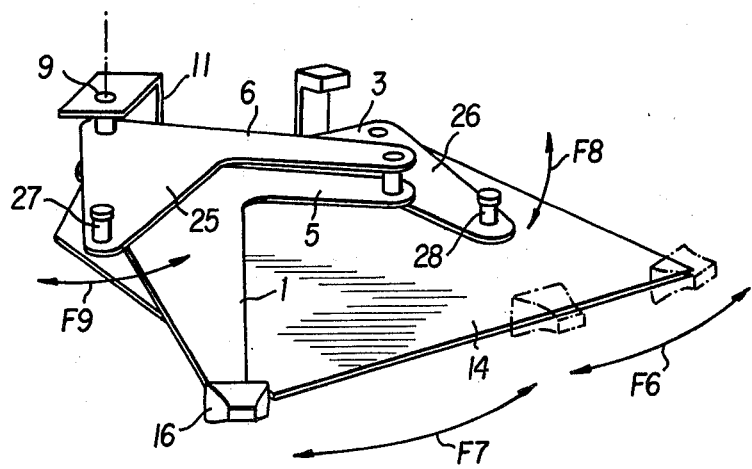
FIG. 5 represents a variant of realization in which the shape of the links permits another orientation of departure of the cables.

FIG. 5 illustrates another embodiment of the invention in which the cable attachment ends of the top 6 and bottom link 3 have other shapes. Thus, the bottom link 3 has an extension 26 on its other end in distinction to the corresponding link of FIGS. 1 to 4, while the upper link 6 has a right angle extension 25 and a single cable attachment pin 27. The parallel and superposed arms of the lever and the links, between the axes, must be retained for identical functioning.

As can be seen, movement of the button 16 following the arrow F6 or F7 results in actuation of the lower link along F8 or the upper link along F9, respectively and in giving the pins 28, 27 angular excursions different from those of their homologs in FIGS. 3 and 4, which permits departures of the cables in different predetermined directions, modifiable at will by adaptation of the ends of the links 3, 6.

With respect to the position of rest of lever 1, the greater length of travel F7 in front is still reserved for the motion of the upper link 6, which, in the case of a single control cable, permits actuation of an air conditioning component requiring a greater effort than the other does.

By modification of the shape of the main lever 1 to bring the button 16 to the middle of the front 14 in the position of rest, there is naturally obtained a balanced distribution of the efforts at the two links.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A multiple-command device for cable control of the air conditioning elements of an automobile comprising:
   a mounting plate immovably fixed to said automobile;
   a control lever;
   at least one link articulated on the plate by a fixed axis serving as pivot for the lever and also articulated on the lever by an axis movable with respect to the plate and offset with respect to the fixed axis, the lever being articulated on the plate successively about said two axes by the intermediary of said at least one link;
   at least one control cable attached to said at least one link;
   a stop on the plate, the movable axis being rendered momentarily fixed by the stop, said at least one link coming to rest against the stop in the course of the excursion of the lever so that the movable axis becomes a new pivot for the rest of the travel of the lever.

2. A multiple-command device for cable control of the air conditioning elements of an automobile comprising:
   a mounting plate;
   a control lever;
   an upper link;
   a lower link;
   each link articulated, on the one hand, on the plate by a fixed axis serving successively as pivot for the lever and, on the other hand, on the lever by an axis movable with respect to the plate and offset with respect to the fixed axis, the lever being articulated on the plate successively about the two axes between the two links;
   a plurality of control cables attached to the links;
   a pair of stops on the plate, each movable axis of a link being rendered momentarily fixed and coincident with the fixed axis of the other link when the first link comes up against its respective stop integral with the plate.

3. The device recited in claim 2 wherein:
   the lever has a right-angled shape one arm of which projects beyond the front of the plate to allow for manipulation of the lever by means of a button and the other arm of which carries at its two ends the movable axes of articulation with the links.

4. The device recited in claims 2 or 3 wherein:
   when the two links are simultaneously against their stops the button for manipulation of the projecting arm of the lever occupies a position offset from the middle of the front of the plate.

5. The device recited in claim 2 wherein:
   the upper link is articulated on the plate by the intermediary of a bracket.

* * * * *